(12) United States Patent
Lin et al.

(10) Patent No.: US 12,346,520 B2
(45) Date of Patent: Jul. 1, 2025

(54) SEAMLESS TOUCHPAD DEVICE

(71) Applicant: ASUSTeK COMPUTER INC., Taipei (TW)

(72) Inventors: Chin-Wen Lin, Taipei (TW); Hung-Yi Lin, Taipei (TW); Wei-Ting Wong, Taipei (TW); Ching-Fu Hsu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 18/396,875

(22) Filed: Dec. 27, 2023

(65) Prior Publication Data

US 2024/0220049 A1   Jul. 4, 2024

(30) Foreign Application Priority Data

Dec. 28, 2022 (TW) .................................. 111150487

(51) Int. Cl.
*G06F 3/041* (2006.01)

(52) U.S. Cl.
CPC ...... *G06F 3/04166* (2019.05); *G06F 3/04164* (2019.05)

(58) Field of Classification Search
USPC ....................................................... 17/18.01
See application file for complete search history.

(56) References Cited

U.S. PATENT DOCUMENTS

| | | | | |
|---|---|---|---|---|
| 2012/0056662 A1* | 3/2012 | Wilson | .................. | G06F 3/0412 327/517 |
| 2014/0054152 A1* | 2/2014 | Wu | ........................ | B82Y 30/00 977/956 |
| 2015/0084903 A1* | 3/2015 | Tai | ...................... | G06F 3/04166 345/173 |
| 2018/0129341 A1* | 5/2018 | Bae | ........................ | H05K 5/0017 |
| 2021/0255720 A1* | 8/2021 | Pan | .......................... | G06F 3/044 |
| 2022/0019330 A1* | 1/2022 | Chang | ................... | G06F 1/1643 |

(Continued)

FOREIGN PATENT DOCUMENTS

| | | | |
|---|---|---|---|
| CN | 102467302 A | * | 5/2012 |
| CN | 103631416 A | | 3/2014 |
| CN | 104331189 A | | 2/2015 |

(Continued)

*Primary Examiner* — Kirk W Hermann
(74) *Attorney, Agent, or Firm* — McClure, Qualey & Rodack, LLP

(57) ABSTRACT

A seamless touchpad device includes at least two adjacent touchpad units, a first touchpad unit and a second touchpad unit. The first touchpad unit includes a plurality of first horizontal signal lines, a plurality of first vertical signal lines and a first control unit connected thereto. The second touchpad unit includes second horizontal signal lines, second vertical signal lines and a second control unit connected, and the second control unit is electrically connected to the first control unit. Each first horizontal signal line is correspondingly connected to one of the second horizontal signal lines, and part of the first vertical signal lines close to the second touchpad unit among the first vertical signal lines is individually connected to part of the second vertical signal lines close to the first touchpad unit among the second vertical signal lines, so as to form an overlapping scanning area.

17 Claims, 8 Drawing Sheets

(56) References Cited

U.S. PATENT DOCUMENTS

2022/0137774 A1\*   5/2022   Park ..................... G06F 3/0443
                                                     345/174

FOREIGN PATENT DOCUMENTS

| CN | 105005423 | A | \* | 10/2015 | | |
| CN | 109981839 | B9 | \* | 8/2021 | ........... | G06F 1/1616 |
| CN | 113778269 | A | | 12/2021 | | |
| KR | 20210097650 | A | \* | 8/2021 | | |
| TW | 202205072 | A | | 2/2022 | | |
| TW | M630457 | U | | 8/2022 | | |

\* cited by examiner

SEAMLESS TOUCHPAD DEVICE

CROSS-REFERENCE TO RELATED APPLICATION

This application claims the priority benefit of Taiwan application serial No. 111150487, filed on Dec. 28, 2022. The entirety of the above-mentioned patent application is hereby incorporated by reference herein and made a part of the specification.

BACKGROUND OF THE INVENTION

Field of the Invention

The disclosure provides a seamless touchpad device with at least two touchpads spliced.

Description of the Related Art

Most of traditional large-area capacitive touchpads include chips with more scanning channels, but it is costly to remove extra scanning channels for achieving a larger area of chips in touch area products with a special length-to-width ratio. When the touchpads are spliced to achieve a greater entire surface, discontinuity of touch information and serious linear distortion are caused generally at a seam by broken patterns between a single touchpad and a corresponding ground ring and independent electric fields between adjacent touchpads, and are to be solved only by a software algorithm, which is less effective.

BRIEF SUMMARY OF THE INVENTION

The disclosure provides a seamless touchpad device, including at least two touchpad units: a first touchpad unit and a second touchpad unit. The first touchpad unit is adjacent to the second touchpad unit. The first touchpad unit includes a plurality of first horizontal signal lines, a plurality of first vertical signal lines and a first control unit connected to the first horizontal signal lines and the first vertical signal lines. The second touchpad unit includes a plurality of second horizontal signal lines, a plurality of second vertical signal lines and a second control unit connected to the second horizontal signal lines and the second vertical signal lines, and the second control unit is electrically connected to the first control unit. Each first horizontal signal line is correspondingly connected to one of the second horizontal signal lines, and part of the first vertical signal lines close to the second touchpad unit among the first vertical signal lines is individually connected to part of the second vertical signal lines close to the first touchpad unit among the second vertical signal lines, so as to form an overlapping scanning area.

To sum up, the disclosure provides a seamless touchpad device, which utilizes scanning signals of common parts of adjacent touchpad units to solve the conventional problems caused by splicing the touchpad units at a seam. In addition, when a plurality of touchpad units is spliced, special functions are provided individually on each touchpad unit. Therefore, the balance between user experience and product cost and functionality is achieved.

DETAILED DESCRIPTION OF THE EMBODIMENTS

Figure 1:
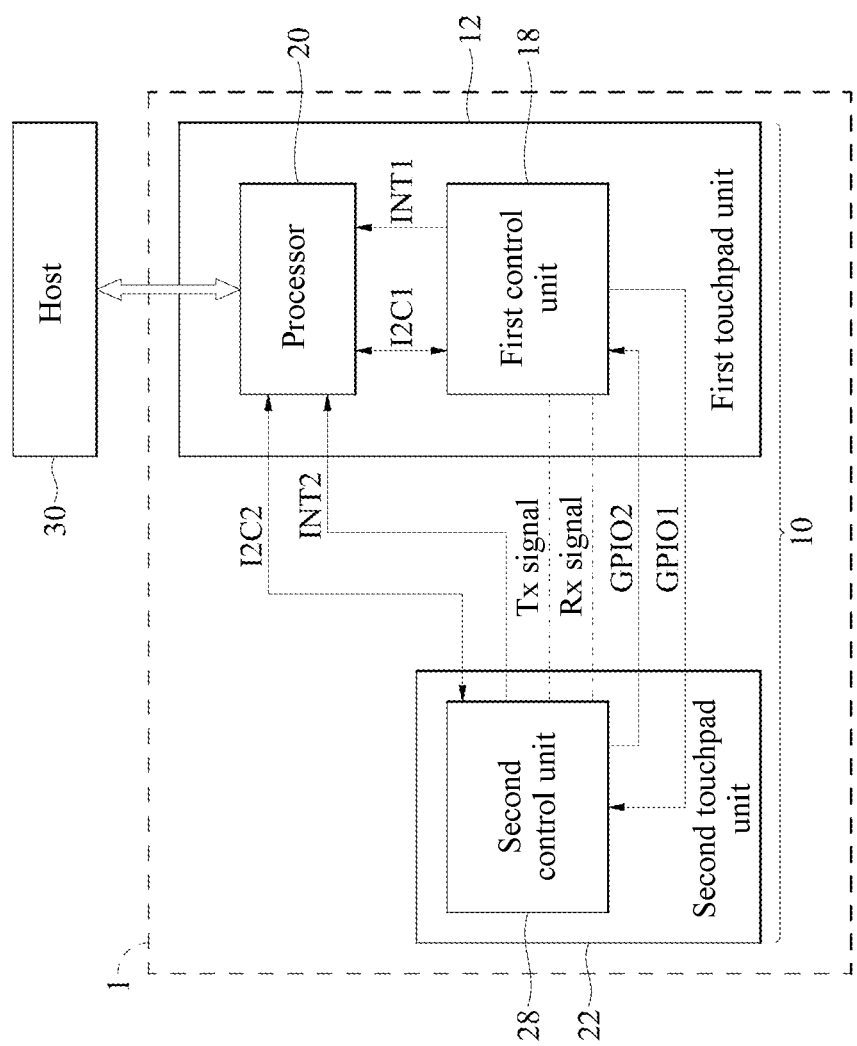
FIG. 1 is a block diagram of a seamless touchpad device according to an embodiment of the disclosure.

Embodiments of the disclosure will be explained below in conjunction with relevant drawings. Furthermore, some elements or structures are omitted in the drawings of the embodiments to clearly show the technical features of the disclosure. In the drawings, like reference numerals refer to identical or similar elements or circuits. It is to be understood that while the terms "first", "second" and the like may be used herein to describe various elements, components, regions or functions, such elements, components, regions and/or functions are not limited by such terms. The terms are used only to separate one element, component, region or function from another element, component, region or function.

Figure 2:
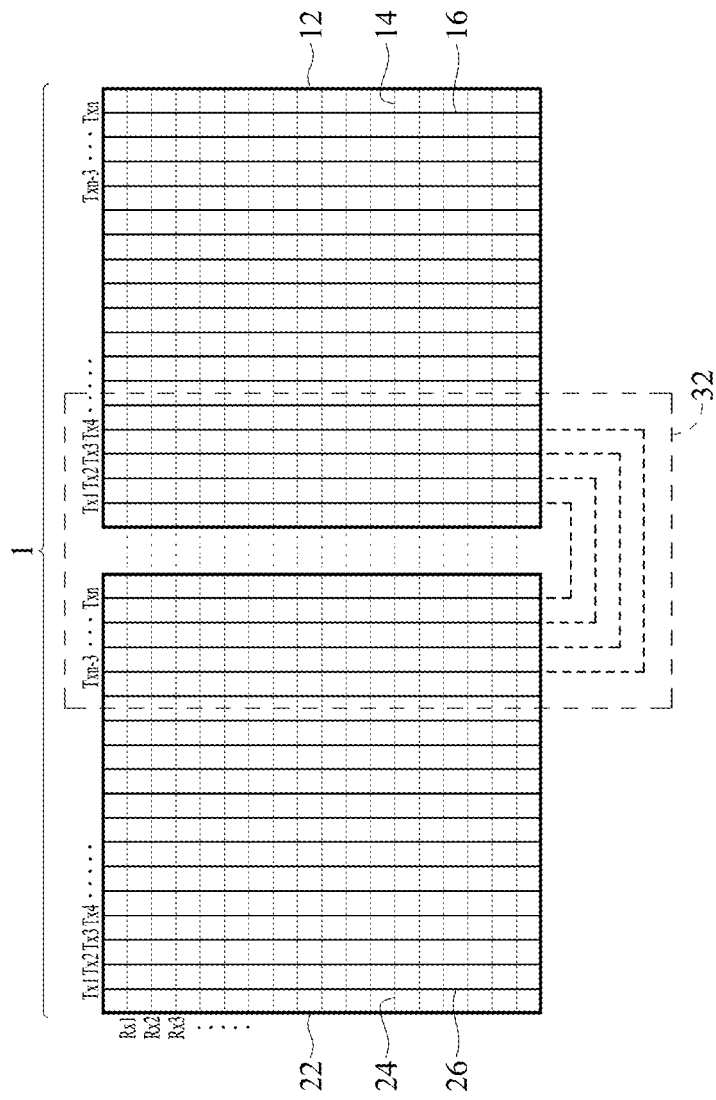
FIG. 2 is a connection diagram of signal lines of two touchpad units according to an embodiment of the disclosure.
Figure 3:
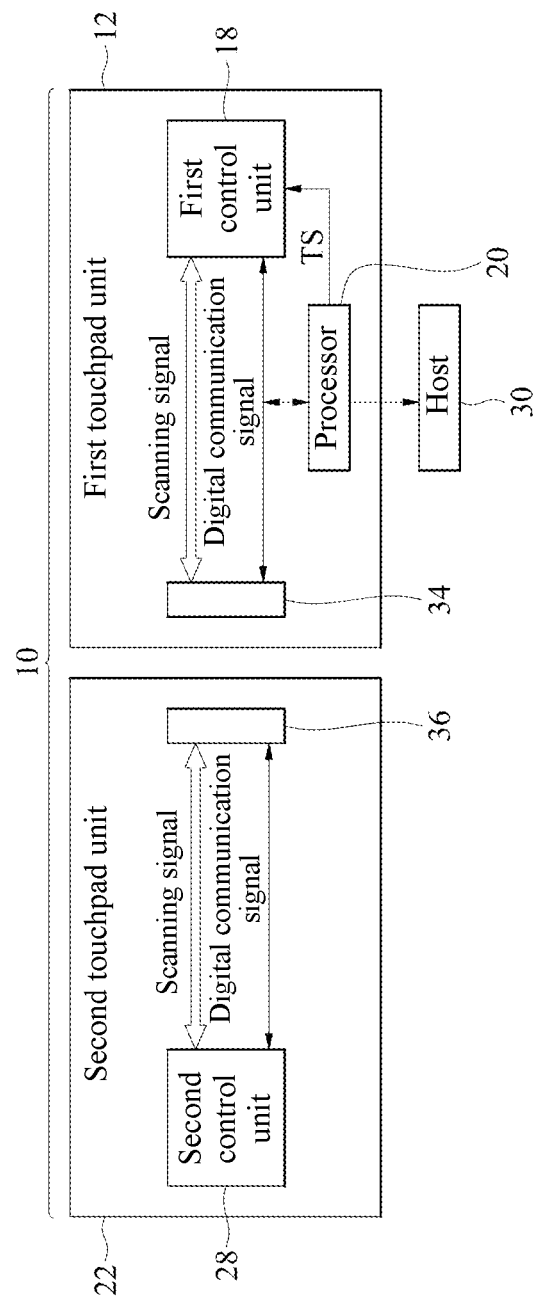
FIG. 3 is a connection diagram of a seamless touchpad device according to an embodiment of the disclosure.

Referring to FIG. 1, FIG. 2 and FIG. 3, a seamless touchpad device 1 includes at least two touchpad units 10. In an embodiment, the seamless touchpad device includes two touchpad units 10, including a first touchpad unit 12 and a second touchpad unit 22. The first touchpad unit 12 is adjacent to the second touchpad unit 22, so that the second touchpad unit 22 is located on the left of the first touchpad unit 12 adjacently, and the first touchpad unit 12 serves as a main touchpad unit. The first touchpad unit 12 includes a plurality of first horizontal signal lines 14, a plurality of first vertical signal lines 16, a first control unit 18 and a processor 20. The plurality of parallel first horizontal signal lines 14 is vertically interleaved with the plurality of parallel first vertical signal lines 16, respectively, to serve as a scanning area. The first control unit 18 is connected to all the first horizontal signal lines 14 and the first vertical signal lines 16. The processor 20 is electrically connected to the first control unit 18 via an integrated circuit ($I^2C$) bus I2C1 to drive the first control unit 18 to start scanning, and receives all report information generated by the first control unit 18. The second touchpad unit 22 includes a plurality of second horizontal signal lines 24, a plurality of second vertical signal lines 26 and a second control unit 28. The plurality of parallel second horizontal signal lines 24 is vertically interleaved with the plurality of parallel second vertical signal lines 26, respectively, to serve as a scanning area. The second control unit 28 is connected to all the second horizontal signal lines 24 and the second vertical signal lines 26, and the second control unit 28 is electrically connected to the first control unit 18. The processor 20 located in the first touchpad unit 12 is also electrically connected to the second control unit 28 via an $I^2C$ bus I2C2 to drive the second control unit 28 to start scanning, and receives all report information generated by the second control unit 28. The processor 20 is connected to a host 30 via a universal serial bus (USB), an I²C bus, or a serial peripheral interface (SPI).

In the first touchpad unit 12 and the second touchpad unit 22, each first horizontal signal line 14 is correspondingly connected to one of the second horizontal signal lines 24, and part of the first vertical signal lines 16 close to the second touchpad unit 22 among the first vertical signal lines 16 is individually connected to part of the second vertical signal lines 26 close to the first touchpad unit 12 among the second vertical signal lines 26, so as to form an overlapping scanning area 32. As shown in FIG. 2, the first horizontal signal lines 14 are connected to the second horizontal signal lines 24 in a one-to-one manner, and four first vertical signal lines 16 on the left of the first touchpad unit 12 are connected to four second vertical signal lines 26 on the right of the second touchpad unit 22, so that a middle connection area serves as the overlapping scanning area 32. In this embodiment, the first horizontal signal line 14 is a first receiving signal line, and the first vertical signal line 16 is a first driving signal line. The second horizontal signal line 24 is a second receiving signal line, and the second vertical signal line 26 is a second driving signal line. Scanning signals are transmitted by the first driving signal line and the second driving signal line, transmission touch signals are received by the first receiving signal line and the second receiving signal line, and an internal impedance of the first driving signal line and the second driving signal line is a high impedance when no scanning signal is transmitted. As shown in FIG. 3, the first touchpad unit 12 includes a first flexible cable connector 34, and the second touchpad unit 22 correspondingly includes a second flexible cable connector 36, so that the first touchpad unit 12 and the second touchpad unit 22 are connected and communicated via the first flexible cable connector 34 and the second flexible cable connector 36 to transmit and communicate all information and signals.

As shown in FIG. 1, FIG. 2 and FIG. 3, in the seamless touchpad device 1, the processor 20 generates a trigger signal TS to the first control unit 18 so that the first touchpad unit 12 starts scanning. The first control unit 18 generates a first general purpose input output (GPIO) signal GPIO1 to inform the second control unit 28 upon completed scanning so that the second touchpad unit 22 continues scanning, and the second control unit 28 generates a second GPIO signal GPIO2 to inform the first control unit 18 of completed scanning upon completed scanning of the second touchpad unit 22. When the first control unit 18 detects generation of a touch signal upon completed scanning of the first touchpad unit 12, an interrupt signal INT1 is generated to the processor 20 to inform the processor 20 of the generation of the touch signal so that the processor 20 reads the report information in the first control unit 18 via the I²C bus I2C1. When the second control unit 28 detects generation of a touch signal upon completed scanning of the second touchpad unit 22, an interrupt signal INT2 is generated to the processor 20 to inform the processor 20 of the generation of the touch signal so that the processor 20 reads the report information in the second control unit 28 via the I²C bus I2C2. The processor 20 receives all report information transmitted by the first control unit 18 and the second control unit 28, and analyzes the report information according to the overlapping scanning area 32 to obtain final report information. Finally, the processor 20 transmits the final report information to the host 30 for subsequent processing by the host 30.

In another embodiment, the first horizontal signal line 14 is a first driving signal line, and the first vertical signal line 16 is a first receiving signal line. The second horizontal signal line 24 is a second driving signal line, and the second vertical signal line 26 is a second receiving signal line. Scanning signals are transmitted by the first driving signal line and the second driving signal line, transmission touch signals are received by the first receiving signal line and the second receiving signal line, and an internal impedance of the first driving signal line and the second driving signal line is a high impedance when no scanning signal is transmitted. The first horizontal signal lines 14 are the first driving signal lines and the second horizontal signal lines 24 are the second driving signal lines, which are connected in pairs. If the signal attenuation of the first driving signal lines and the second driving signal lines is too large, an amplifier (not shown in the figure) is provided between each first driving signal line and the corresponding second driving signal line respectively to facilitate signal transmission.

In an embodiment, the processor 20 is further directly provided in the first control unit 18 without additional arrangement.

Figure 4:
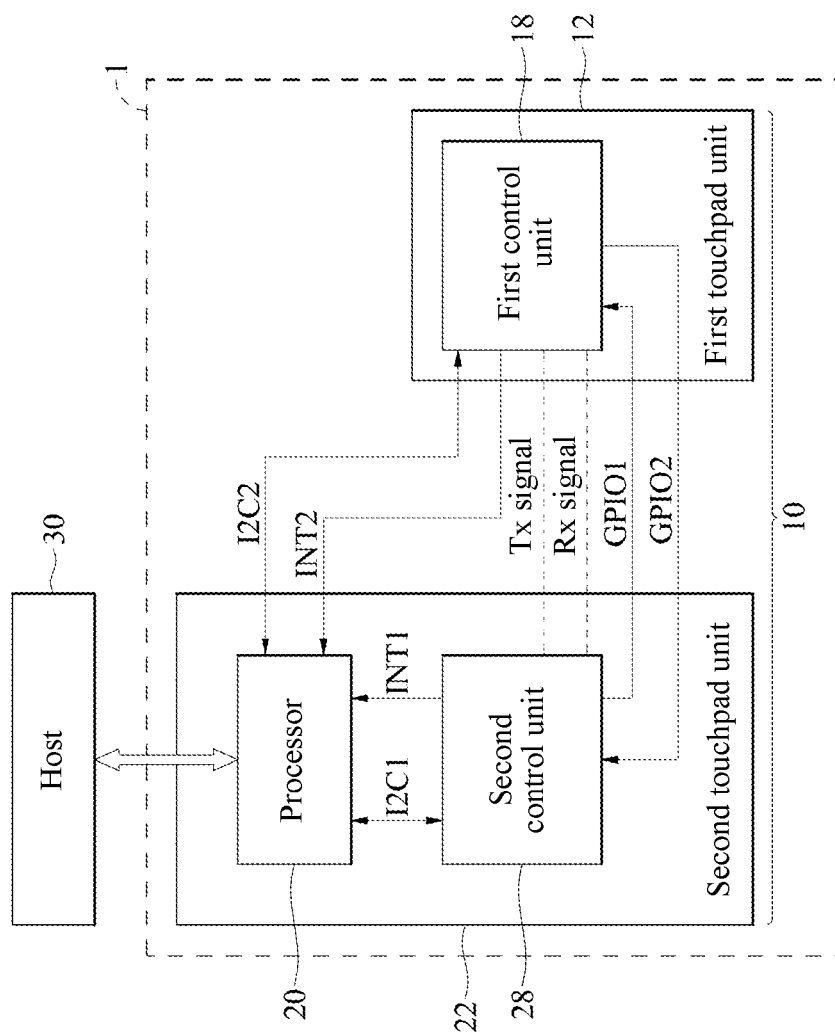
FIG. 4 is a block diagram of a seamless touchpad device according to another embodiment of the disclosure.

Referring to FIG. 2 and FIG. 4, a seamless touchpad device 1 includes at least two touchpad units. In an embodiment, the seamless touchpad device includes two touchpad units, including a first touchpad unit 12 and a second touchpad unit 22. The first touchpad unit 12 is adjacent to the second touchpad unit 22, so that the second touchpad unit 22 is located on the left of the first touchpad unit 12 adjacently, and the second touchpad unit 22 serves as a main touchpad unit. The first touchpad unit 12 includes a plurality of first horizontal signal lines 14, a plurality of first vertical signal lines 16 and a first control unit 18. The plurality of parallel first horizontal signal lines 14 is vertically interleaved with the plurality of parallel first vertical signal lines 16, respectively, to serve as a scanning area. The first control unit 18 is connected to all the first horizontal signal lines 14 and the first vertical signal lines 16. The second touchpad unit 22 includes a plurality of second horizontal signal lines 24, a plurality of second vertical signal lines 26, a second control unit 28 and a processor 20. The plurality of parallel second horizontal signal lines 24 is vertically interleaved with the plurality of parallel second vertical signal lines 26, respectively, to serve as a scanning area. The second control unit 28 is connected to all the second horizontal signal lines 24 and the second vertical signal lines 26, and the second control unit 28 is electrically connected to the first control unit 18. The processor 20 is electrically connected to the first control unit 18 and the second control unit 28 simultaneously. The connection relationships between the first horizontal signal line 14 and the first vertical signal line 16 and between the second horizontal signal line 24 and the second vertical signal line 26 are the same as those in the previous embodiments. As shown in FIG. 2 and FIG. 4, in the first touchpad unit 12 and the second touchpad unit 22, each first horizontal signal line 14 is correspondingly connected to one of the second horizontal signal lines 24, and part of the first vertical signal lines 16 close to the second touchpad unit 22 among the first vertical signal lines 16 is individually connected to part of the second vertical signal lines 26 close to the first touchpad unit 12 among the second vertical signal lines 26, so as to form an overlapping scanning area 32.

In the seamless touchpad device 1, the processor 20 generates a trigger signal TS to the second control unit 28 so that the second touchpad unit 22 starts scanning. The second control unit 28 generates a first GPIO signal GPIO1 to inform the first control unit 18 upon completed scanning so that the first touchpad unit 12 continues scanning, and the first control unit 18 generates a second GPIO signal GPIO2 to inform the second control unit 28 of completed scanning upon completed scanning of the first touchpad unit 12. When the second control unit 28 detects generation of a touch signal upon completed scanning of the second touchpad unit 22, an interrupt signal INT1 is generated to the processor 20 to inform the processor 20 of the generation of the touch signal so that the processor 20 reads the report information in the second control unit 28 via the I$^2$C bus I2C1. When the first control unit 18 detects generation of a touch signal upon completed scanning of the first touchpad unit 12, an interrupt signal INT2 is generated to the processor 20 to inform the processor 20 of the generation of the touch signal so that the processor 20 reads the report information in the first control unit 18 via the I$^2$C bus I2C2. The processor 20 receives all report information transmitted by the second control unit 28 and the first control unit 18, and analyzes the report information according to the overlapping scanning area 32 to generate final report information. Finally, the processor 20 transmits the final report information to the host 30 for subsequent processing by the host 30.

In another embodiment, the processor 20 is further directly provided in the second control unit 28 without additional arrangement.

Figure 5:
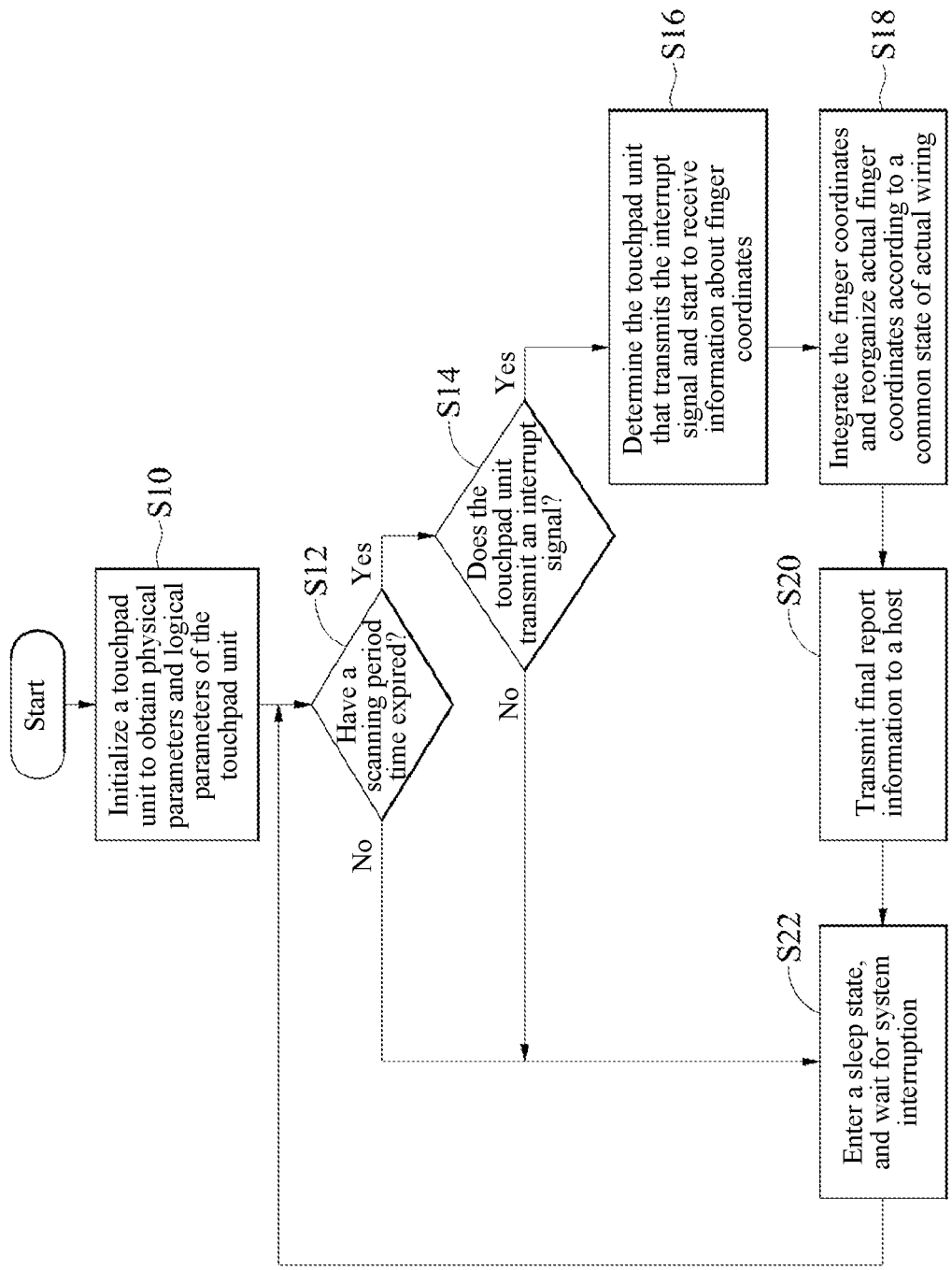
FIG. 5 is a flow diagram of scanning touchpad units of a seamless touchpad device according to an embodiment of the disclosure.

Referring to FIG. 1, FIG. 4 and FIG. 5, a scanning operation of the touchpad unit 10 is performed with the processor 20 as a starting point. First, as shown in step S10, all the touchpad units (including the first touchpad unit 12 and the second touchpad unit 22) are initialized, and physical parameters and logical parameters of the touchpad units 10 are obtained. As shown in step S12, all the touchpad units 10 are sequentially scanned, and it is determined whether a scanning period time has expired (that is, whether all the scanning operations have been completed). If the scanning period has expired, step S14 is continued. If the scanning period has not expired, the process proceeds to step S22 directly. As shown in step S14, it is determined whether the touchpad unit 10 transmits an interrupt signal. If the interrupt signal is transmitted, step S16 is continued. If the touchpad unit 10 does not transmit an interrupt signal, the process proceeds to step S22 directly. As shown in step S16, the processor 20 determines the touchpad unit 10 that transmits the interrupt signal and starts to receive report information about finger coordinates. Then, as shown in step S18, the processor 20 integrates the report information of the finger coordinates and reorganizes actual finger coordinates according to a common state of the actually wired overlapping scanning area 32 to generate final report information. As shown in step S20, the final report information is transmitted to the host 30. Finally, as shown in step S22, a sleep state is entered to wait for system interruption to enter a next cycle, and another cycle is started from step S12 again.

Figure 6:
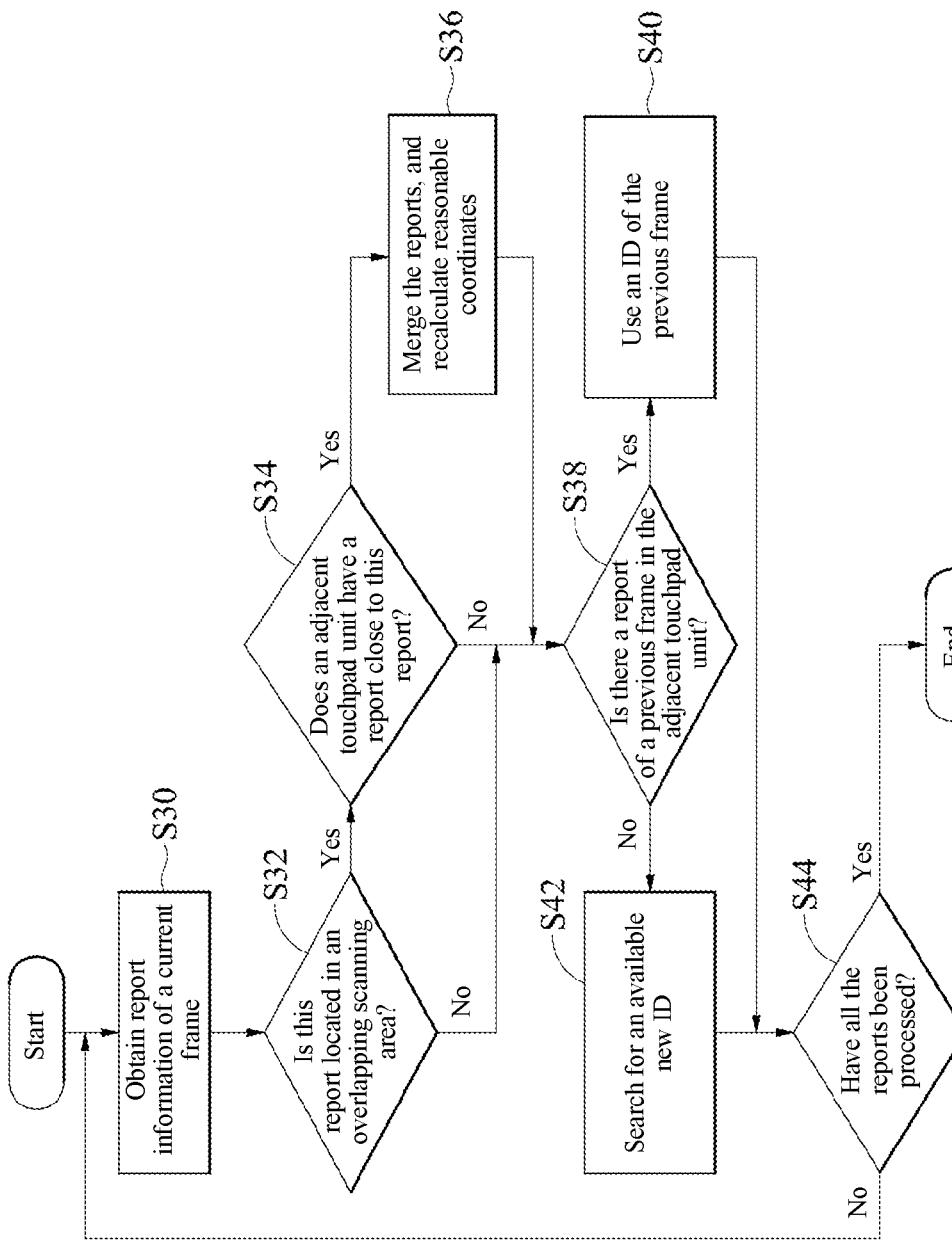
FIG. 6 is a flow diagram of integrating a plurality of report information by a processor in a seamless touchpad device according to an embodiment of the disclosure.

Referring to FIG. 1, FIG. 4 and FIG. 6, a detailed flow of the processor 20 in integrating the report information of the finger coordinates is shown in step S30 to step S44. First, as shown in step S30, the processor 20 obtains report information of a current frame from the touchpad unit 10. Then, as shown in step S32, it is determined whether the finger coordinates of this report are located in the overlapping scanning area 32. If the finger coordinates are located in the overlapping scanning area 32, the process proceeds to step S34. If the finger coordinates are not located in the overlapping scanning area 32, the process proceeds to step S38 directly. As shown in step S34, it is determined whether the adjacent touchpad unit 10 has another report close to this report. If yes, step S36 is continued. If no, the process proceeds to step S38 directly. As shown in step S36, the two reports are merged to recalculate reasonable coordinate information. As shown in step S38, it is determined whether there is a report of a previous frame in the adjacent touchpad unit 10. If yes, an identification code (ID) of the previous frame is used as shown in step S40. If there is no report of the previous frame, an available new ID is searched as shown in step S42. Then, as shown in step S44, it is determined whether all the reports have been processed. If no, the process returns to step S30 to continue the aforementioned steps. If all the reports have been processed, the entire integration step is terminated, so that the processor 20 analyzes and integrates final report information.

Figure 7:
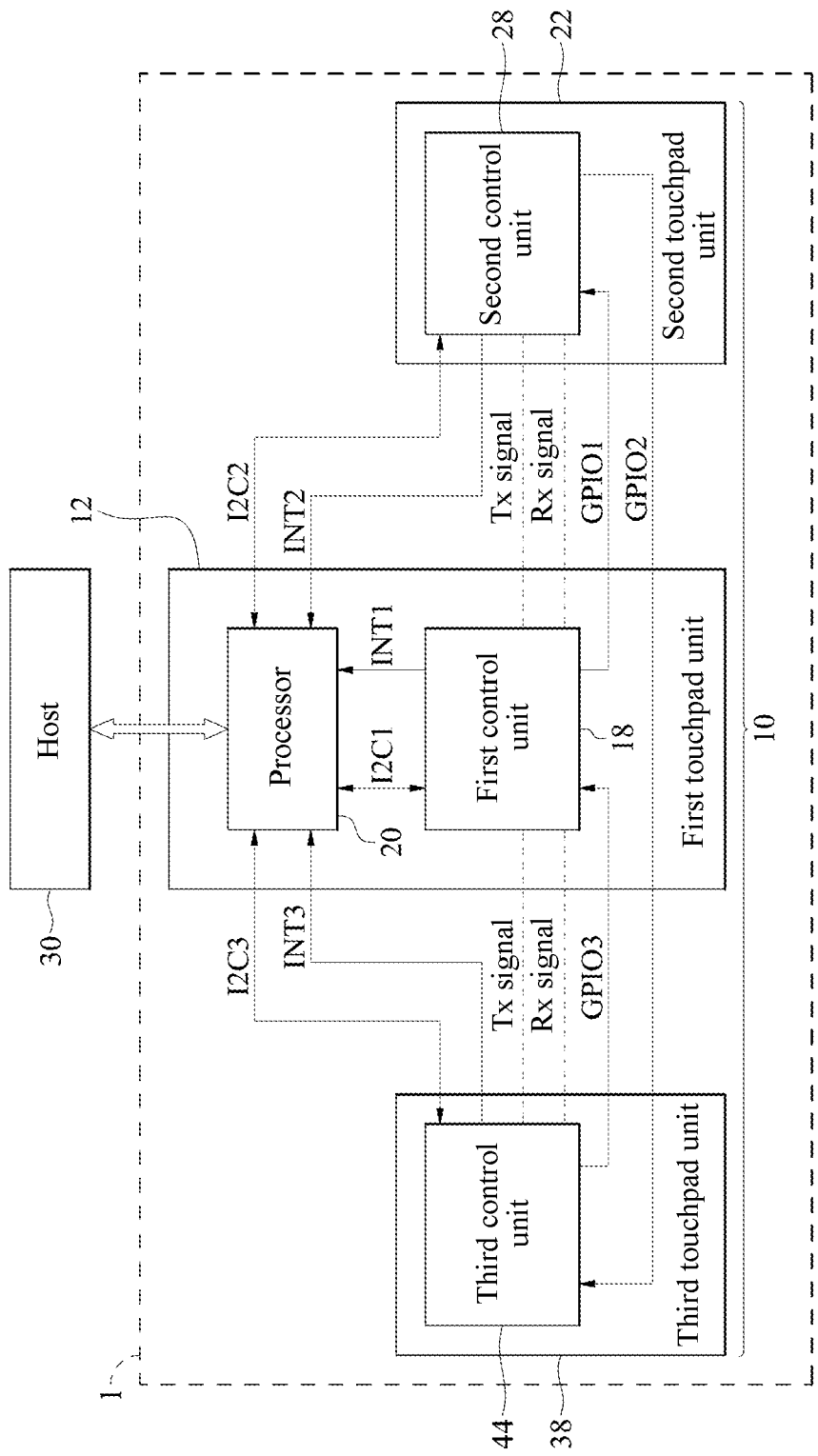
FIG. 7 is a block diagram of a seamless touchpad device according to yet another embodiment of the disclosure.
Figure 8:
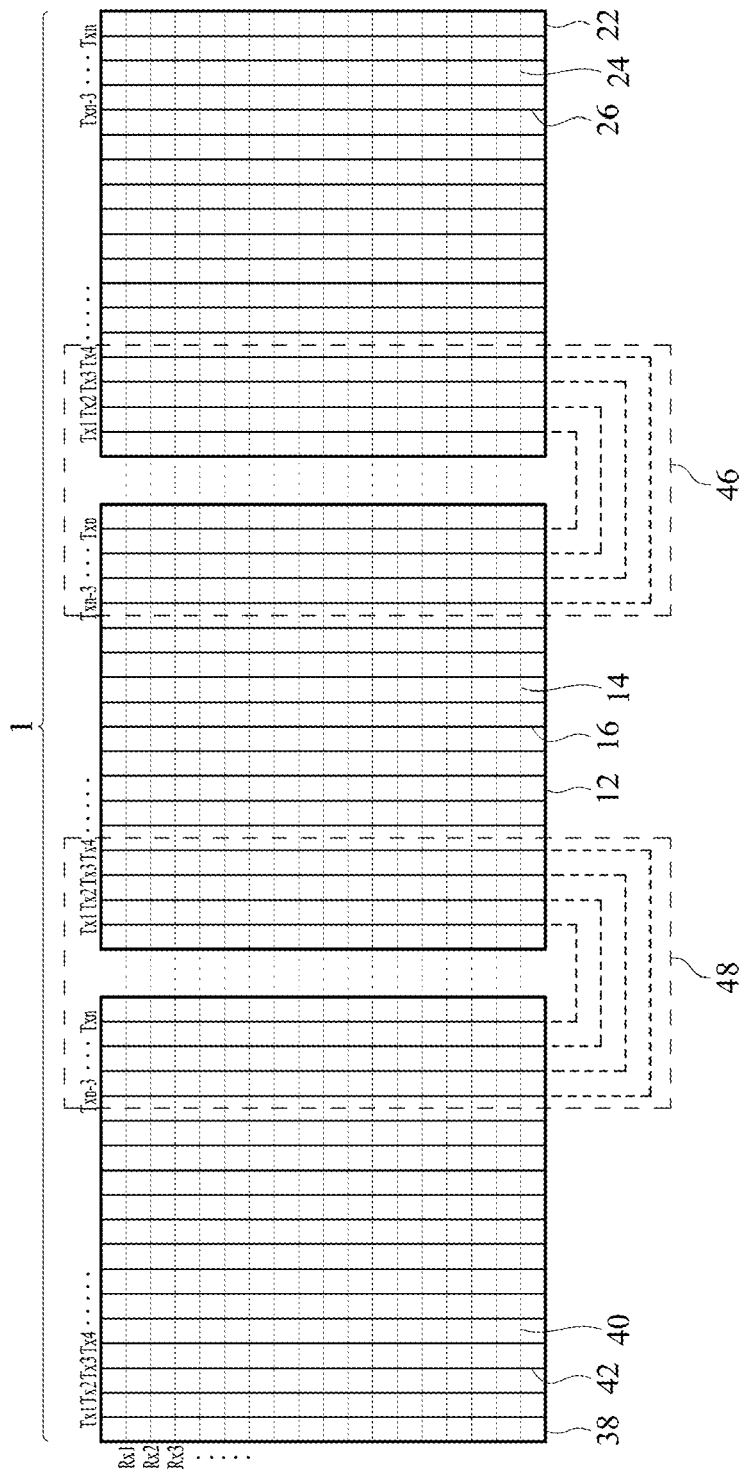
FIG. 8 is a connection diagram of signal lines of three touchpad units according to an embodiment of the disclosure.

Referring to FIG. 7 and FIG. 8, a seamless touchpad device 1 includes three touchpad units 10, including a first touchpad unit 12, a second touchpad unit 22 and a third touchpad unit 38. The second touchpad unit 22 is located on the right of the first touchpad unit 12, and the third touchpad unit 38 is located on the left of the first touchpad unit 12, so that the right of the first touchpad unit 12 is adjacent to the second touchpad unit 22 and the left of the first touchpad unit 12 is adjacent to the third touchpad unit 38. The first touchpad unit 12 serves as a main touchpad unit.

The first touchpad unit 12 includes a plurality of first horizontal signal lines 14, a plurality of first vertical signal lines 16, a first control unit 18 and a processor 20. The plurality of parallel first horizontal signal lines 14 is vertically interleaved with the plurality of parallel first vertical signal lines 16, respectively, to serve as a scanning area. The first control unit 18 is connected to all the first horizontal signal lines 14 and the first vertical signal lines 16. The processor 20 is electrically connected to the first control unit 18, and the processor 20 is also electrically connected to a host 30. The second touchpad unit 22 includes a plurality of second horizontal signal lines 24, a plurality of second vertical signal lines 26 and a second control unit 28. The plurality of parallel second horizontal signal lines 24 is vertically interleaved with the plurality of parallel second vertical signal lines 26, respectively, to serve as a scanning area. The second control unit 28 is connected to all the second horizontal signal lines 24 and the second vertical signal lines 26, and the second control unit 28 is electrically connected to the first control unit 18. The processor 20 located in the first touchpad unit 12 is electrically connected to the second control unit 28. The third touchpad unit 38 includes a plurality of third horizontal signal lines 40, a plurality of third vertical signal lines 42 and a third control unit 44. The plurality of parallel third horizontal signal lines 40 is vertically interleaved with the plurality of parallel third vertical signal lines 42, respectively, to serve as a scanning area. The third control unit 44 is connected to all the third horizontal signal lines 40 and the third vertical signal lines 42, and the third control unit 44 is electrically connected to the first control unit 18 and the second control unit 28. The processor 20 located in the first touchpad unit 12 is also electrically connected to the third control unit 44. The processor 20 is electrically connected to the first control unit 18, the second control unit 28 and the third control unit 44 via the I$^2$C buses I2C1, I2C2 and I2C3, respectively. Therefore, the first control unit 18, the second control unit 28 and the third control unit 44 are driven to start scanning sequentially, and all the report information generated by the first control unit 18, the second control unit 28 and the third control unit 44 is received. In another embodiment, the processor 20 is also connected in parallel with the first control unit 18, the second control unit 28 and the third control unit 44 via the same I²C bus.

As shown in FIG. 7 and FIG. 8, in the first touchpad unit 12 and the second touchpad unit 22, each first horizontal signal line 14 is correspondingly connected to one of the second horizontal signal lines 24, and part of the first vertical signal lines 16 close to the second touchpad unit 22 among the first vertical signal lines 16 is individually connected to part of the second vertical signal lines 26 close to the first touchpad unit 12 among the second vertical signal lines 26, so as to form a first overlapping scanning area 46. In the first touchpad unit 12 and the third touchpad unit 38, each first horizontal signal line 14 is correspondingly connected to one of the third horizontal signal lines 40, and part of the first vertical signal lines 16 close to the third touchpad unit 38 among the first vertical signal lines 16 is individually connected to part of the third vertical signal lines 42 close to the first touchpad unit 12 among the third vertical signal lines 42, so as to form a second overlapping scanning area 48. As shown in FIG. 8, the first horizontal signal lines 14 are connected to the second horizontal signal lines 24 in a one-to-one manner, and four first vertical signal lines 16 on the right of the first touchpad unit 12 are individually connected to four second vertical signal lines 26 on the left of the second touchpad unit 22, so that a middle connection area serves as the first overlapping scanning area 46. In addition, the first horizontal signal lines 14 are connected to the third horizontal signal lines 40 in a one-to-one manner, and four first vertical signal lines 16 on the left of the first touchpad unit 12 are individually connected to four third vertical signal lines 42 on the right of the third touchpad unit 38, so that a middle connection area serves as the second overlapping scanning area 48. In this embodiment, the first horizontal signal line 14 is a first receiving signal line, and the first vertical signal line 16 is a first driving signal line. The second horizontal signal line 24 is a second receiving signal line, and the second vertical signal line 26 is a second driving signal line. The third horizontal signal line 40 is a third receiving signal line, and the third vertical signal line 42 is a third driving signal line. Scanning signals are transmitted by the first driving signal line, the second driving signal line and the third driving signal line, transmission touch signals are received by the first receiving signal line, the second receiving signal line and the third receiving signal line, and an internal impedance of the first driving signal line, the second driving signal line and the third driving signal line is a high impedance when no scanning signal is transmitted.

As shown in FIG. 7 and FIG. 8, in the seamless touchpad device 1, the processor 20 generates a trigger signal TS to the first control unit 18 so that the first touchpad unit 12 starts scanning. The first control unit 18 generates a first GPIO signal GPIO1 to inform the second control unit 28 upon completed scanning so that the second touchpad unit 22 continues scanning, the second control unit 28 generates a second GPIO signal GPIO2 to inform the third control unit 44 upon completed scanning of the second touchpad unit 22 so that the third touchpad unit 38 continues scanning, and the third control unit 44 generates a third GPIO signal GPIO3 to inform the first control unit 18 of completed scanning upon completed scanning of the third touchpad unit 38. When the first control unit 18 detects generation of a touch signal upon completed scanning of the first touchpad unit 12, an interrupt signal INT1 is generated to the processor 20 to inform the processor 20 of the generation of the touch signal so that the processor 20 reads the report information in the first control unit 18 via the I2C bus I2C1. When the second control unit 28 detects generation of a touch signal upon completed scanning of the second touchpad unit 22, an interrupt signal INT2 is generated to the processor 20 to inform the processor 20 of the generation of the touch signal so that the processor 20 reads the report information in the second control unit 28 via the I²C bus I2C2. When the third control unit 44 detects generation of a touch signal upon completed scanning of the third touchpad unit 38, an interrupt signal INT3 is generated to the processor 20 to inform the processor 20 of the generation of the touch signal so that the processor 20 reads the report information in the third control unit 44 via the I²C bus I2C3. The processor 20 receives all report information transmitted by the first control unit 18, the second control unit 28 and the third control unit 44, and analyzes the report information according to the first overlapping scanning area 46 and the second overlapping scanning area 48 to obtain final report information. Finally, the processor 20 transmits the final report information to the host 30 for subsequent processing by the host 30.

Further, other connection relationships and actions of the seamless touchpad device 1 shown in FIG. 7 and FIG. 8 are the same as those of the embodiment of FIG. 1 except that the number of touchpad units 10 is different, are thus described with reference to the foregoing, and will not be repeated herein. Furthermore, in the seamless touchpad device 1, in addition to using the first touchpad unit 12 as the main touchpad unit, in other embodiments, the second touchpad unit 22 or the third touchpad unit 38 is selected as the main touchpad unit. At this moment, the processor 20 is correspondingly arranged in the second touchpad unit 22 or the third touchpad unit 38.

In an embodiment, the first control unit 18 is a touchpad IC, the second control unit 28 is a touchpad IC, and the third control unit 44 is a touchpad IC.

In an embodiment, the processor 20 is a general-purpose or special-purpose micro control unit (MCU), a microprocessor, a programmable controller, an application specific integrated circuit (ASIC), etc.

In an embodiment, if GPIO signals GPIO1, GPIO2 and GPIO3 are not used, the signals are transmitted via an I2C between the processor 20 and the touchpad unit 10 after polling.

In an embodiment, the interrupt signals INT1, INT2 and INT3 are not necessary signals. Without the interrupt signals INT1, INT2 and INT3, a touch signal is obtained by polling.

To sum up, the disclosure provides a seamless touchpad device, which utilizes scanning signals of common parts of adjacent touchpad units to solve the conventional problems caused by splicing the touchpad units at a seam. In addition, when a plurality of touchpad units is spliced, special functions such as a writing pad, a number pad and a dial touchpad are provided individually on each touchpad unit. Therefore, the balance between user experience and product cost and functionality is achieved.

The above embodiments are only intended to illustrate the technical ideas and characteristics of the disclosure, and to enable those skilled in the art to understand the content of the disclosure and implement it accordingly. However, the patent scope of the disclosure cannot be limited. That is, all equal changes or modifications made in accordance with the spirit disclosed in the disclosure are still covered in the patent application scope of the disclosure.

What is claimed is:

1. A seamless touchpad device, comprising:
   at least two touchpad units, comprising a first touchpad unit and a second touchpad unit, the first touchpad unit being adjacent to the second touchpad unit,
   the first touchpad unit comprising a plurality of first horizontal signal lines, a plurality of first vertical signal lines and a first control unit connected to the first horizontal signal lines and the first vertical signal lines, and
   the second touchpad unit comprising a plurality of second horizontal signal lines, a plurality of second vertical signal lines and a second control unit connected to the second horizontal signal lines and the second vertical signal lines, and the second control unit being electrically connected to the first control unit,
   wherein each of the first horizontal signal lines is correspondingly connected to one of the second horizontal signal lines, and part of the first vertical signal lines close to the second touchpad unit among the first vertical signal lines is individually connected to part of the second vertical signal lines close to the first touchpad unit among the second vertical signal lines, so as to form an overlapping scanning area; and
   wherein the first horizontal signal line is a first receiving signal line, the first vertical signal line is a first driving signal line, the second horizontal signal line is a second receiving signal line, the second vertical signal line is a second driving signal line, and an internal impedance of the first driving signal line and the second driving signal line is a high impedance when no scanning signal is transmitted.

2. The seamless touchpad device according to claim 1, wherein when the first touchpad unit is a main touchpad unit, the first touchpad unit further comprises a processor, and the processor is electrically connected to the first control unit and the second control unit to receive all report information generated by the first control unit and the second control unit, and analyzes the report information according to the overlapping scanning area to generate final report information.

3. The seamless touchpad device according to claim 2, wherein the processor is further provided in the first control unit.

4. The seamless touchpad device according to claim 2, wherein the processor further generates a trigger signal to the first control unit so that the first touchpad unit starts scanning, and the first control unit informs the second control unit upon completed scanning so that the second touchpad unit continues scanning.

5. The seamless touchpad device according to claim 4, wherein the first control unit generates a first general purpose input output (GPIO) signal to inform the second control unit upon completed scanning of the first touchpad unit so that the second touchpad unit continues scanning, and the second control unit generates a second GPIO signal to inform the first control unit of completed scanning upon completed scanning of the second touchpad unit.

6. The seamless touchpad device according to claim 2, wherein when the first control unit or the second control unit detects generation of a touch signal, an interrupt signal is generated to the processor to inform the processor of the generation of the touch signal so that the processor reads the report information in the first control unit or the second control unit.

7. The seamless touchpad device according to claim 6, wherein the processor is connected to the first control unit and the second control unit via an integrated circuit ($I^2C$) bus to receive the report information respectively.

8. The seamless touchpad device according to claim 2, wherein the first touchpad unit and the second touchpad unit are connected and communicated via a flexible cable connector.

9. The seamless touchpad device according to claim 1, wherein when the second touchpad unit is a main touchpad unit, the second touchpad unit further comprises a processor, and the processor is electrically connected to the first control unit and the second control unit to receive all report information generated by the first control unit and the second control unit, and analyzes the report information according to the overlapping scanning area to generate final report information.

10. The seamless touchpad device according to claim 9, wherein the processor is further provided in the second control unit.

11. The seamless touchpad device according to claim 9, wherein the processor further generates a trigger signal to the second control unit so that the second touchpad unit starts scanning, and the second control unit informs the first control unit upon completed scanning so that the first touchpad unit continues scanning.

12. The seamless touchpad device according to claim 11, wherein the second control unit generates a first GPIO signal to inform the first control unit upon completed scanning of the second touchpad unit so that the first touchpad unit continues scanning, and the first control unit generates a second GPIO signal to inform the second control unit of completed scanning upon completed scanning of the first touchpad unit.

13. The seamless touchpad device according to claim 9, wherein when the first control unit or the second control unit detects generation of a touch signal, an interrupt signal is generated to the processor to inform the processor of the generation of the touch signal so that the processor reads the report information in the first control unit or the second control unit.

14. The seamless touchpad device according to claim 13, wherein the processor is connected to the first control unit and the second control unit via an integrated circuit ($I^2C$) bus to receive the report information respectively.

15. The seamless touchpad device according to claim 9, wherein the first touchpad unit and the second touchpad unit are connected and communicated via a flexible cable connector.

16. A seamless touchpad device, comprising:
   at least two touchpad units, comprising a first touchpad unit and a second touchpad unit, the first touchpad unit being adjacent to the second touchpad unit,
   the first touchpad unit comprising a plurality of first horizontal signal lines, a plurality of first vertical signal lines and a first control unit connected to the first horizontal signal lines and the first vertical signal lines, and
   the second touchpad unit comprising a plurality of second horizontal signal lines, a plurality of second vertical signal lines and a second control unit connected to the second horizontal signal lines and the second vertical signal lines, and the second control unit being electrically connected to the first control unit,
   wherein each of the first horizontal signal lines is correspondingly connected to one of the second horizontal signal lines, and part of the first vertical signal lines close to the second touchpad unit among the first vertical signal lines is individually connected to part of the second vertical signal lines close to the first touchpad unit among the second vertical signal lines, so as to form an overlapping scanning area; and wherein the first horizontal signal line is a first driving signal line, the first vertical signal line is a first receiving signal line, the second horizontal signal line is a second driving signal line, the second vertical signal line is a second receiving signal line, and an internal impedance of the first driving signal line and the second driving signal line is a high impedance when no scanning signal is transmitted.

17. A seamless touchpad device, comprising:

at least two touchpad units, comprising a first touchpad unit and a second touchpad unit, the first touchpad unit being adjacent to the second touchpad unit, the first touchpad unit comprising a plurality of first horizontal signal lines, a plurality of first vertical signal lines and a first control unit connected to the first horizontal signal lines and the first vertical signal lines, and the second touchpad unit comprising a plurality of second horizontal signal lines, a plurality of second vertical signal lines and a second control unit connected to the second horizontal signal lines and the second vertical signal lines, and the second control unit being electrically connected to the first control unit, wherein each of the first horizontal signal lines is correspondingly connected to one of the second horizontal signal lines, and part of the first vertical signal lines close to the second touchpad unit among the first vertical signal lines is individually connected to part of the second vertical signal lines close to the first touchpad unit among the second vertical signal lines, so as to form an overlapping scanning area;

wherein when the first touchpad unit is a main touchpad unit, the first touchpad unit further comprises a processor, and the processor is electrically connected to the first control unit and the second control unit to receive all report information generated by the first control unit and the second control unit, and analyzes the report information according to the overlapping scanning area to generate final report information; and wherein the processor further generates a trigger signal to the first control unit so that the first touchpad unit starts scanning, and the first control unit informs the second control unit upon completed scanning so that the second touchpad unit continues scanning.

* * * * *